United States Patent [19]

Breen et al.

[11] Patent Number: 5,141,726
[45] Date of Patent: Aug. 25, 1992

[54] PROCESS FOR REDUCNG $NO_x$ EMISSIONS FROM COMBUSTION DEVICES

[75] Inventors: Bernard P. Breen, Pittsburgh, Pa.; James E. Gabrielson, Plymouth, Minn.

[73] Assignee: Consolidated Natural Gas Service Company, Inc., Pittsburgh, Pa.

[21] Appl. No.: 608,989

[22] Filed: Nov. 5, 1990

[51] Int. Cl.$^5$ .......................... C01B 21/00; B01J 8/00
[52] U.S. Cl. ...................... 423/235; 423/239
[58] Field of Search ................ 423/239, 239 A, 235, 423/235 D

[56] References Cited

U.S. PATENT DOCUMENTS

| | | | |
|---|---|---|---|
| 3,808,323 | 4/1974 | Collins et al. | 423/239 |
| 4,597,342 | 7/1986 | Green | 110/347 |
| 4,779,545 | 10/1988 | Breen et al. | 110/212 |
| 4,790,743 | 12/1988 | Leikert et al. | 431/8 |

FOREIGN PATENT DOCUMENTS 0280568 8/1988 European Pat. Off. .

OTHER PUBLICATIONS

Pages 1-12 of undated manual by Peter Langsjoen "A Guide to Clean and Efficient Operation of titled Coal Stoked Fired Boilers".

*Primary Examiner*—Gregory A. Heller
*Attorney, Agent, or Firm*—Ingersoll Buchanan

[57] ABSTRACT

Nitrogen oxide and dioxide content of flue gas from combustion devices is reduced by mixing combustion air and a gas or volatilized fuel in proportions below the lower combustible limit of the mixture and utilizing that mixture for at least a part of the combustion air supplied to the devices. The mixture may take the form of air contaminated with a fuel.

25 Claims, 2 Drawing Sheets

PROCESS FOR REDUCING NO_x EMISSIONS FROM COMBUSTION DEVICES

BACKGROUND OF THE INVENTION

1. Field of the Invention

The present invention relates to a process of reducing nitrogen oxide emissions from combustion devices.

2. Description of the Prior Art

In the combustion of fuels with fixed nitrogen such as coal, oxygen from the air may combine with the fixed nitrogen to produce nitrogen oxide NO or nitrogen dioxide $NO_2$ which are collectively called nitrogen oxides or $NO_x$. At sufficiently high temperatures, oxygen reacts with atmospheric nitrogen to form nitrogen oxides. So, even fuels that have no fixed nitrogen produce nitrogen oxides when fired with excess air at sufficiently high temperatures. Production of nitrogen oxides is regarded as undesirable. There are numerous government regulations which limit the amount of nitrogen oxides which may be emitted from combustion devices. Furthermore, the presence of nitrogen oxides in a flue gas causes the condensate formed from the gases to become more corrosive and acidic. Consequently, there is a need for apparatus and processes which reduce the nitrogen oxide emissions in flue gas.

Numerous attempts have been made to develop apparatus and processes which reduce the nitrogen oxide emissions from combustion devices. Among the attempts are burner redesigns such as dual register low $NO_x$ burners, staged air combustion, flue gas recirculation, reduced air preheat, and increased furnace size. All of these techniques have had some success, but all suffer from some limitations and they are expensive. Currently more stringent regulations are forcing the development of new processes for $NO_x$ control.

One such new approach is a process known as in furnace $NO_x$ reduction, reburning, or fuel staging. In reburning, coal, oil, or gas is injected above the normal flame zone to form a fuel-rich zone. In this zone, part of the nitrogen oxides are reduced to ammonia-like and cyanide like fragments which are then oxidized to form $N_2$ and nitrogen oxide.

Several problems occur when this process is used. First, coal may be an inefficient reburn fuel because of its high fixed nitrogen composition. The fixed nitrogen introduced at this location in the furnace will have less chance of being converted to $N_2$, and therefor have a higher chance of ending up as nitrogen oxides and may, depending on the nitrogen oxide concentration of the flue gas, increase the emissions of nitrogen oxides.

Furthermore, the fuel must be injected with a sufficient volume of gas. If air is used as this gas, there must be enough fuel to consume the oxygen in the flue gas and air, and to supply an excess of fuel so reducing conditions exist. This increases the amount of fuel which must be used as reburn fuel. Furthermore, the necessity of using carrier air requires extensive duct work in the upper part of the furnace.

Additionally, the reburn fuel must be injected well above the primary combustion zone of the furnace so that it will not interfere with the reactions taking place therein. However, this fuel must be made to burn out completely without leaving a large amount of unburned carbon. To do this, the fuel must be injected in a very hot region of the furnace some distance from the furnace exit. The exit temperature of the furnace must be limited in order to preserve the heat exchanger's surface. Therefore, a tall furnace is required to complete this second stage process.

Moreover, the fuel must be injected in quantities sufficient to make the upper furnace zone fuel-rich. This excess fuel ultimately requires more air in order to be completely combusted. Thus, air must be injected above the zone of reburn fuel injection. This arrangement requires even more duct work and furnace volume. This excess air must consume the reburn fuel before the gases reach the furnace entrance.

Finally, most coal furnaces which are now in operation are not designed to accommodate the prior art methods. Major modifications such as the provision of extensive duct work and the addition of a second stage to the process are required to utilize the prior art method. Such retrofitting is expensive. Consequently, there is a need for a combustion process requiring little additional apparatus which will reduce nitrogen oxide emissions in flue gas and which can be readily used in existing furnaces.

SUMMARY OF THE INVENTION

In accordance with the present invention, there is provided an improved process for reducing $NO_x$ content in combustion device flue gas. A combustible gas or volatile liquid such as natural gas or hexane is premixed with the combustion air in an amount below the lower combustible limit of the air/fuel mixture. This fuel burns as it mixes with hot combustion products in the furnace.

We prefer that the fuel which is mixed with the combustion air have little or no fixed nitrogen. As this fuel burns, it will not produce nitrogen oxides by the reaction between oxygen and fixed nitrogen. Part of the air will mix with partially cooled but still relatively hot combustion products and the fuel carried in with the air will burn as this mixing occurs. This combustion will be at relatively low temperature, that is, much below 3000° F., where very little nitrogen oxides can form from nitrogen in the air and oxygen in the air. In addition, the fuel in the air when it mixes late into the combustion process will burn producing radicals such as $CH_2$, CH, $CH_3$, and OH, which will react with NO to produce $N_2$ and reduced nitrogen species which will react further with NO to form $N_2$. The fuel can be added to the combustion air before or after the forced draft fan, or before the burner if there is no forced draft fan. Alternatively, air which is contaminated with combustible materials can be used as the combustion air.

Because of the simplicity of our process, it is well suited for retrofitting existing boilers, furnaces, heaters, kilns and other combustion devices. Our process uses air into which a small amount of fuel has been mixed in order to operate the combustion device. The fuel is introduced into the air as simply as possible. Part of the fuel, so introduced, will be burned at low temperatures resulting in low nitrogen oxide emissions. Other advantages of the invention will become apparent from the description of the preferred embodiments.

DESCRIPTION OF A PREFERRED EMBODIMENT

Figure 1:
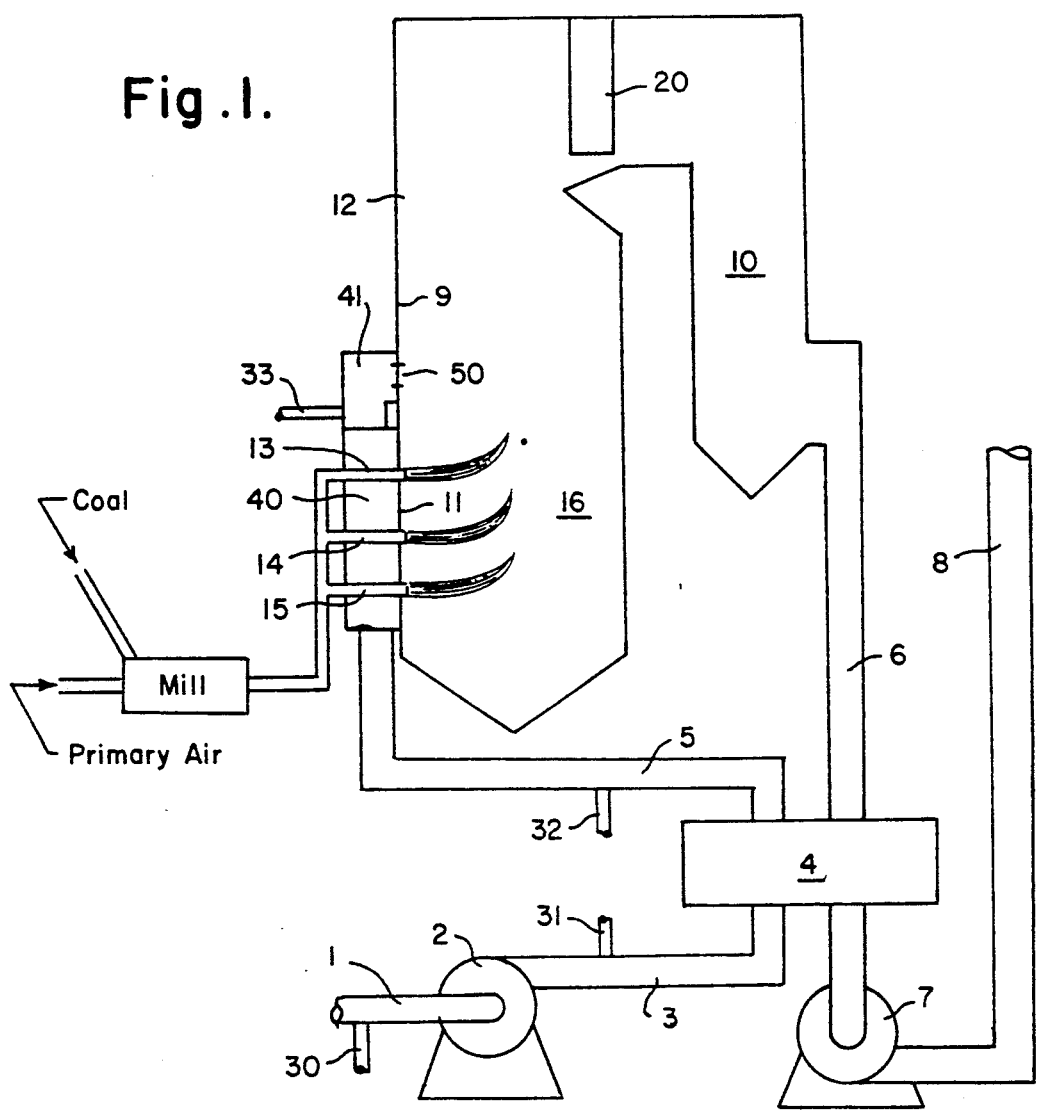
FIG. 1 is a schematic of a furnace arrangement having burners, which arrangement is suitable for the practice of our invention.
Figure 2:
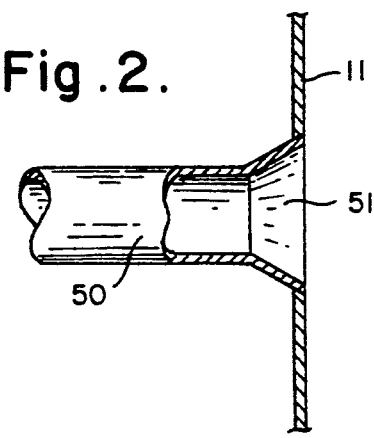
FIG. 2 is a side view partially in section of an overfired air throat suitable for the furnace of FIG. 1.

As shown in FIG. 1 of the drawings, our new process for reducing the nitrogen oxide content of gases in flues 10, 6, and/or 8, can be readily practiced in a retrofitted existing furnace 12. The furnace 12 can be one which uses coal that may be milled and combined with primary air or other fuel, although it is shown here using coal. The furnace may be designed to produce steam or heat other materials, but here it is shown as part of a steam generation system. The fuel enters the furnace 12 by way of fuel entries 13, 14 and 15, which are located in the lower portion of the furnace 12. It burns in large part in the primary combustion zone 16 which typically has temperatures which can exceed 3000° F. The combustion products produced in the primary combustion zone 16 are cooled by the furnace walls 9 and then by the convective section or heat exchanger 20. They progress through duct sections 10 and 6 into the air heater 4, where they are cooled further by the incoming air. They then proceed into the induced draft fan 7 which expels them into the stack 8, and from there into the atmosphere. The flue gas has a temperature range of 2100° F. to 2400° F. when it exits the furnace near the heat exchanger 20. Accordingly, at any point above the primary flame zone 16 the temperature is lower than it is in that zone. During the combustion of the fuel, some of the fixed nitrogen reacts with oxygen to form nitrogen oxides. Nitrogen oxides are also formed from atmospheric nitrogen and oxygen. During the process, secondary air is taken in by the forced draft fan 2 and conveyed by duct work 3 into the air heater 4 where it is heated and flows through duct work 5 into the secondary air plenum 40, which supplies secondary air to the burners 13, 14 and 15 on furnace wall 11. Fan 2 may also supply secondary air by an additional duct or plenum 41 to overfire air ports 50 which are provided in some furnaces near the burners. As shown in FIG. 2, the overfire air port 50 may have a throat 51. Primary air which may be extracted from the heated secondary air source or other sources, and coal are fed to a mill where the coal is pulverized and blown into the burners. Overfire air ports 50 are sometimes used to add additional air in order to complete combustion beyond the burners if they operate with near stoichiometric or even slightly fuel-rich mixtures. The purpose of such a procedure is to reduce the nitrogen oxide emissions.

Figure 3:
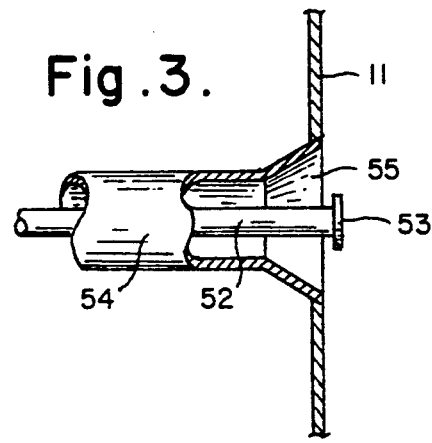
FIG. 3 is a side view partially in section of a burner which is suitable for the furnace of FIG. 1.

In other furnaces, secondary air is introduced around the primary air and fuel stream as shown in FIG. 3. In this arrangement, a pipe 52 which carries the primary air and fuel stream, is positioned within housing 54 which carries secondary air. Commonly, a throat 55 is provided at the entry of the housing 54 through the adjacent furnace wall 11. A spreader 53 may be provided on the entry of pipe 52. Frequently, the entire structure in FIG. 3 is called a burner.

We provide fuel addition apparatus 30, 31, 32 or 33 which may be pipes, nozzles, orifices, or injectors with static mixing devices as needed. The fuel addition apparatus may be positioned at the secondary air intake as is pipe 30, after the forced draft fan as is pipe 31, after the air heater 32, or in the duct to overfire air plenum 41 as is pipe 33. These devices introduce natural gas or other gaseous or volatile fuels having little or no fixed nitrogen into the secondary air stream so that those fuels are well mixed with the air before they enter the furnace. The resulting fuel/air mixture does not have enough fuel to burn at ambient conditions. As it mixes into flames in the furnace or with hot gases from the primary flames, the fuel in the air burns. Much of the fuel burns at temperatures well below the peak flame temperature.

Much of the fuel burns at low temperature. Almost all of the fuel which enters through overfire air ports 50 will burn at low temperature. This combustion will reduce the $NO_x$ by a number of mechanisms, plus the combustion of this fuel heats the overfire air and so assists in mixing it into the combustion products.

An alternative method of introducing the air/fuel mixture is to start with an air stream which is naturally or industrially contaminated with a fuel. This mixture can be introduced at air intake 30. An example of this is coal mine ventilation air which contains methane.

Fuels desirable in addition to natural gas are hydrogen, petroleum products and compounds of the form $C_xH_y$ or $C_yH_yO_z$ and mixtures of these.

These fuels as they burn at low temperatures, form very little nitrogen oxide. In addition, their combustion produces fuel radicals such as CH, $CH_2$, $CH_3$, and others which react rapidly with previously formed nitrogen oxide to reduce it to near its low equilibrium values which exist at those low temperatures. The radicals react with nitrogen oxide to form nitrogen-like, ammonia-like, and cyanide-like compounds:

$$CH_3 + NO_x \rightarrow N_2 + NH_i + H_jCN \quad (1)$$

These reduced nitrogen compounds react with additional nitrogen oxide to form nitrogen by the following reactions:

$$NH_i + NO \rightarrow + H_jO \quad (2)$$

$$H_jCN + NO \rightarrow N_2 + H_jCO \quad (3)$$

These equations characterize the process, but do not show all the reactions, pathways and intermediate species which may occur.

We may add the fuel to the air in various locations. We prefer to keep the concentration below the lower explosive limit of the air/fuel mixture. This lower explosive limit will be the upper limit for the heated air after it leaves the air heater. However, as it is heated further in the furnace, it will ignite and burn. Most of this further heating will be by mixing with combustion products.

If the furnace uses overfire air ports 50, it may be desirable to add the fuel only to the air going to the overfire air ports as indicated by line 33. All of the fuel will burn at low temperatures. The maximum $NO_x$ reduction per unit of fuel mixed with air will be achieved.

As we have mentioned, we also use the process of this invention to consume air which has been contaminated with fuel. Such air may be mine ventilation air, paint booth ventilation air, print drying air, solvent drying air and other air which has been contaminated with combustible materials. Such use reduces nitrogen oxide emissions, saves energy, reduces hydrocarbon emissions, and prevents hydrocarbons emissions from becoming part of the greenhouse effect problem. If such waste air/fuel streams are directed to overfire air ports or burner out of service registers, the nitrogen oxide emissions are even further reduced.

The use of fuel mixed with air will reduce nitrogen oxides in the flue gas in three ways. First, the fuel contains little if any fixed nitrogen. Consequently, unlike a fuel containing fixed nitrogen, the combustion of this fuel creates very little additional nitrogen oxide. Second, since at least part of the fuel which has been mixed with air will burn at a lower temperature, very little nitrogen oxide will form. Third, natural gas also reduces the amount of nitrogen oxides in the flue gas directly by the chemical reactions set forth in equations (1), (2), and (3) above.

In addition to providing a large reduction in the nitrogen oxide content of flue gas, our invention is cost effective as a retrofit to existing furnaces, boilers, kilns, and heaters.

Figure 4:
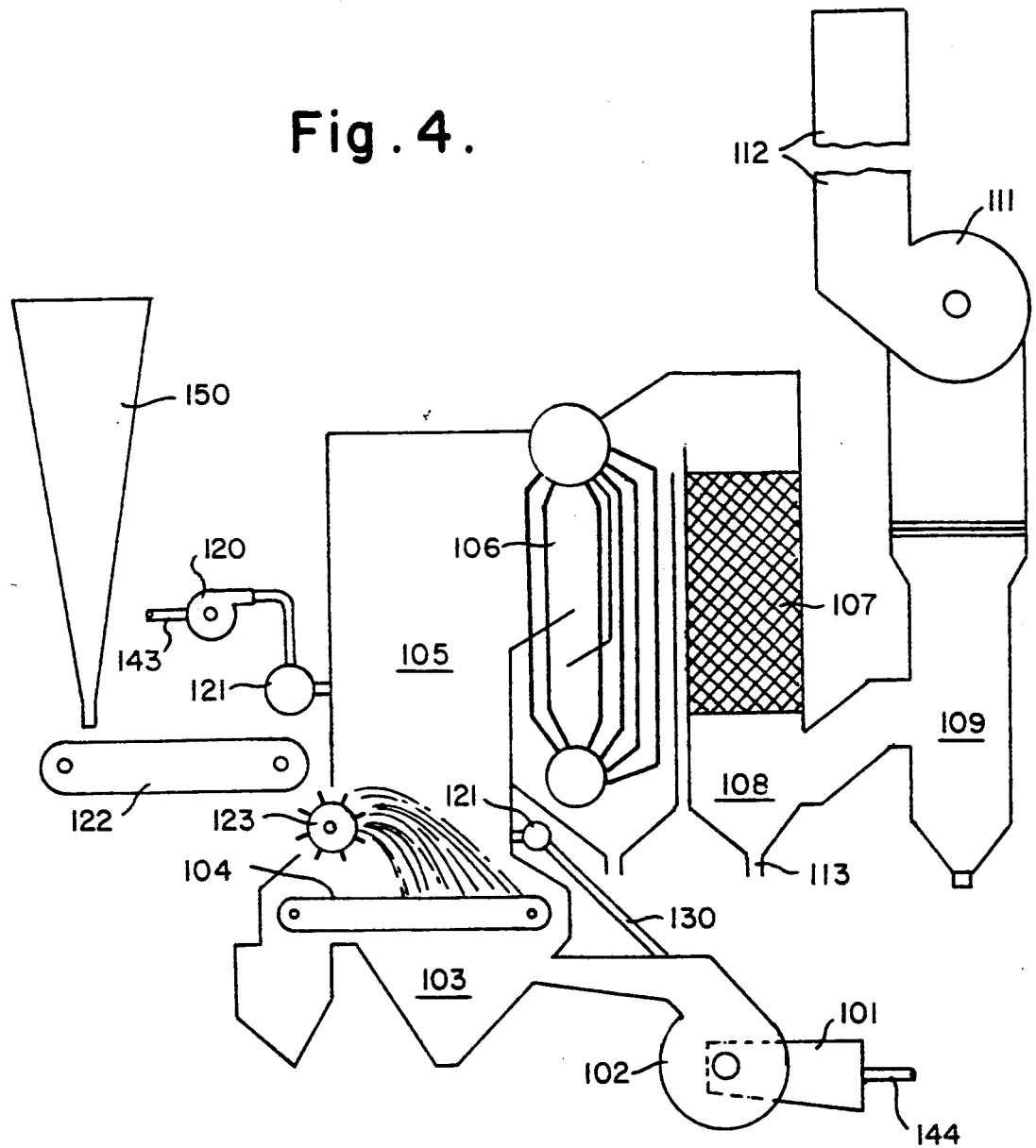
FIG. 4 is a schematic of a furnace arrangement having a moving grate, which arrangement is satisfactory for the practice of our invention.

Our process is also useful for stoker fired boilers, one of which is illustrated in FIG. 4. The process can be used on any type of stoker. This particular stoker is a spreader stoker, which has a rotary spreader 123 to throw the coal onto the grate 104. A feeder 122 delivers the coal from a bunker 150 to the rotary spreader 123. Air is taken into the ID fan 102 through the inlet duct 101, where it passes to the undergrate plenum 103. From the plenum 103 it passes through the grate 104 and burns the coal on the grate. Some of the coal also burns above the grate. The air, combustion products, volatile hydrocarbons from the coal, and partially burned products progress to a higher level in furnace 105 where combustion continues. To improve the combustion, overfire air is often added to stoker furnaces to assist in the mixing. The overfire air is supplied by overfire air fans 120 or duct work 130 from the primary air fan and it flows to headers 121 and from the headers it flows through multiple pipes into the furnace mixing the gases and completing the combustion. From the upper furnace the flue gas flows through to convective pass 106 to the economizer 107, the ash hopper 108, into the dust collector 109 into the induced draft fan 111 and finally into the stack 112. In the stack, the flue gas will contain nitrogen oxides. Stokers may or may not have air heaters and either or both of the induced draft or induced draft fans may not be used.

In order to implement our invention on stokers, we will add gaseous fuel or volatile fuel through pipes 143 or 144 to the air before it enters the induced draft fan 102 or the overfire air fan 120, to the air after it leaves those fans 102 or 120, or to the air in ducts 121 leading to the overfire air headers. Alternatively, air contaminated with fuel can be introduced in place of all or part of the usual undergrate or overfire air.

While we have shown and described a present preferred embodiment of the invention and have illustrated a present preferred method of practicing the same, it is to be distinctly understood that the invention is not limited thereto, but may be otherwise variously embodied and practiced within the scope of the following claims.

We claim:

1. A process for reducing the nitrogen oxide content of flue gas from a combustion device in which fuel and combustion air are combined to cause combustion comprising forming a mixture of combustion air and one of gaseous fuel and volatilized fuel in proportions below the lower combustible limit of said mixture and substituting said mixture for at least part of said combustion air.

2. The process of claim 1 in which said mixture supplies from about 0.5% to about 25% of the fuel energy required for combustion to said combustion device.

3. The process of claim 1 in which said fuel is a gas.

4. The process of claim 1 in which said gas is natural gas.

5. The process of claim 1 in which said volatilized fuel is selected from the group consisting of oil and natural gas.

6. The process of claim 1 in which said volatilized fuel is a volatile hydrocarbon.

7. The process of claim 1 in which said gaseous fuel is hydrogen.

8. The process of claim 1 in which said volatilized fuel is a compound with a general formula $C_xH_yO_z$.

9. The process of claim 1 in which air contaminated with at least one of a volatile fuel and a gaseous fuel is used for at least part of the air mixture.

10. The process of claim 9 in which said air contaminated with a gaseous fuel is mine ventilation air.

11. The process of claim 9 wherein said air contaminated with a volatile fuel is paint booth ventilation air.

12. The process of claim 9 wherein said air contaminated with a volatile fuel is print drying air.

13. The process of claim 9 wherein said air contaminated with a volatile fuel contains solvents.

14. The process of claim 9 wherein said air contaminated with a gaseous fuel is gob well gas.

15. The process of claim 9 wherein said air contaminated with a gaseous fuel comes from landfill gas.

16. The process of claim 9 including the step of diluting the air contaminated with one of a gaseous and a volatile fuel by mixing said air contaminated with fuel with additional atmospheric air.

17. The process of claim 9 including the step of adding fuel to said air contaminated with a volatile fuel.

18. The process of claim 1 wherein said mixture is optimized to maximize $NO_x$ reduction.

19. The process of claim 1 in which said combustion device is supplied with both primary air and secondary air and in which said mixture is applied both as primary air and secondary air.

20. The process of claim 1 wherein said combustion device is supplied with primary air only and in which said mixture is optimized to maximize the $NO_x$ reduction.

21. The process of claim 1 in which the combustion device has at least two air fuel mixture entries and said mixture is introduced through fuel entries which are not receiving any other fuel.

22. The process of claim 1 in which said mixture is formed upstream of said combustion device.

23. A process for reducing the nitrogen oxide content of flue gas from a combustion device having burners and overfire air ports comprising forming a mixture of combustion air and one of a gaseous fuel and a volatilized fuel in proportions below the lower combustible limit of said mixture and introducing said mixture through one of at least one burner, at least one overfire air port, at least one entry adjacent a burner and at least one entry adjacent an overfire air port.

24. The process of claim 23 in which at least one burner is supplied with only said mixture.

25. The process of claim 23 in which only said mixture is supplied to at least one of said overfire air ports.

* * * * *